(12) United States Patent
Stene et al.

(10) Patent No.: US 7,243,979 B1
(45) Date of Patent: Jul. 17, 2007

(54) RECREATIONAL AND UTILITY TRAILER

(75) Inventors: Brian Stene, Inver Grove Heights, MN (US); Gerald J. Nelson, St. Hilaire, MN (US)

(73) Assignees: Aurora Borealis Sales & Distributing, Inc., Inver Grove Heights, MN (US); River Ridge Designs, Inc., St. Hilaire, MN (US)

( * ) Notice: Subject to any disclaimer, the term of this patent is extended or adjusted under 35 U.S.C. 154(b) by 155 days.

(21) Appl. No.: 11/000,745

(22) Filed: Dec. 1, 2004

Related U.S. Application Data

(60) Provisional application No. 60/526,730, filed on Dec. 3, 2003.

(51) Int. Cl.
*B60P 3/35* (2006.01)

(52) U.S. Cl. .................. 296/168; 296/163; 296/181.3; 296/193.07

(58) Field of Classification Search .............. 296/163, 296/168, 181.3, 184.1, 193.07; 414/495
See application file for complete search history.

(56) References Cited

U.S. PATENT DOCUMENTS

| | | | | |
|---|---|---|---|---|
| 3,866,935 A | * | 2/1975 | Nelson | 414/476 |
| 6,592,139 B1 | * | 7/2003 | Shanahan | 280/414.5 |
| 7,073,816 B1 | * | 7/2006 | Larson et al. | 296/165 |
| 2004/0184903 A1 | * | 9/2004 | Neider | 414/495 |
| 2006/0012145 A1 | * | 1/2006 | Gardner | 280/124.128 |

* cited by examiner

*Primary Examiner*—Lori L. Lyjak
(74) *Attorney, Agent, or Firm*—Faegre & Benson LLP

(57) ABSTRACT

A recreational utility trailer having a subfloor and a fold-up top deck creating a storage space therebetween for storing a fabric shelter. The trailer also has movable suspension and hinged tongue for raising the trailer to a transit position and for lowering the trailer to a loading position. The suspension uses fluid cylinders to raise and lower the trailer. A hinged frame supports the fabric shelter when erected, and is storable between the subfloor and top deck. Attachment points may be provided to secure one or more accessories or a load to the trailer.

20 Claims, 15 Drawing Sheets

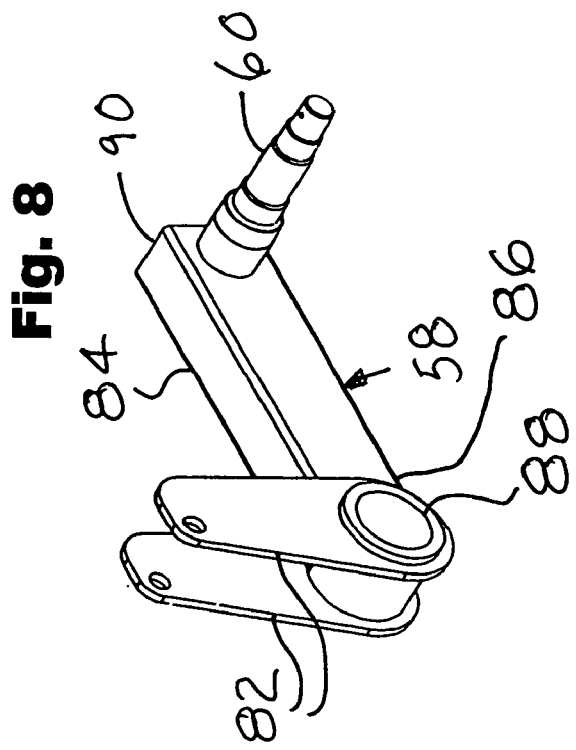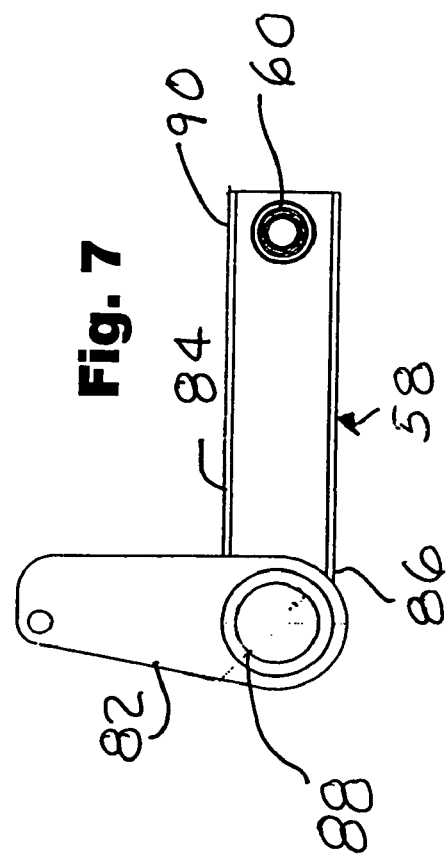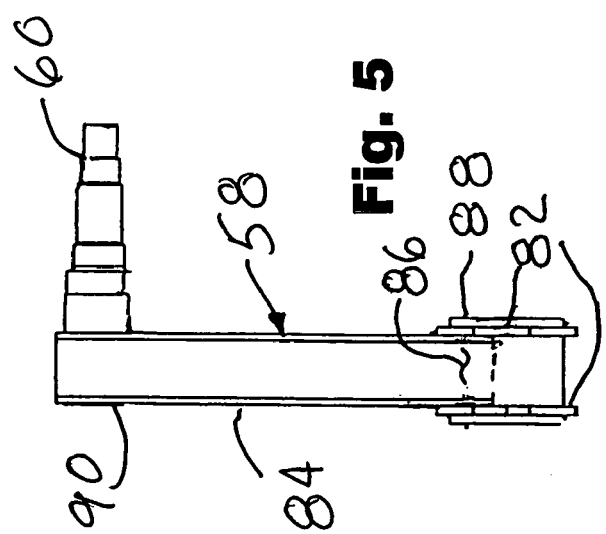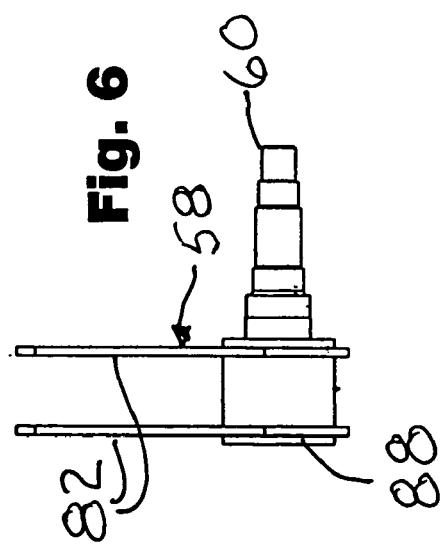

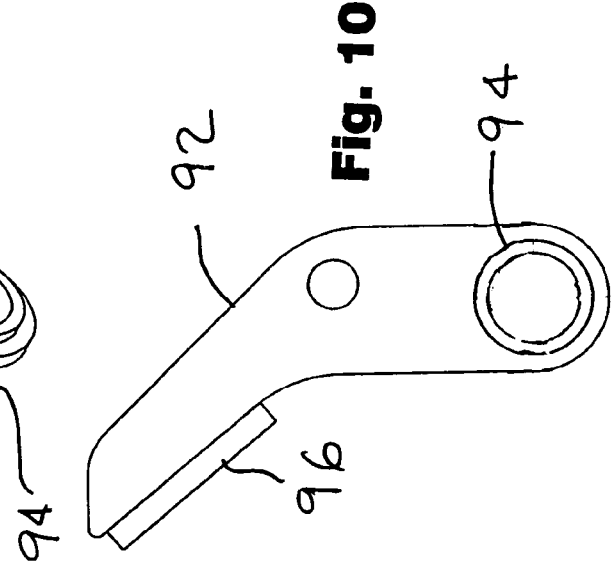
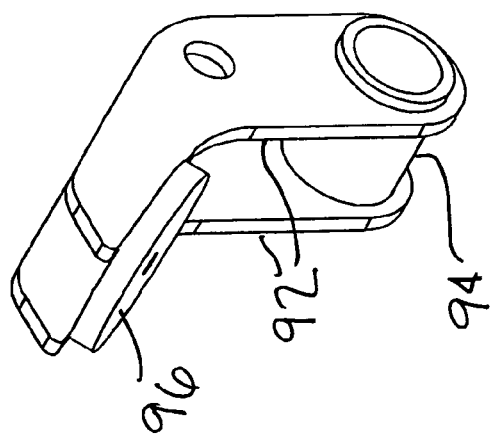
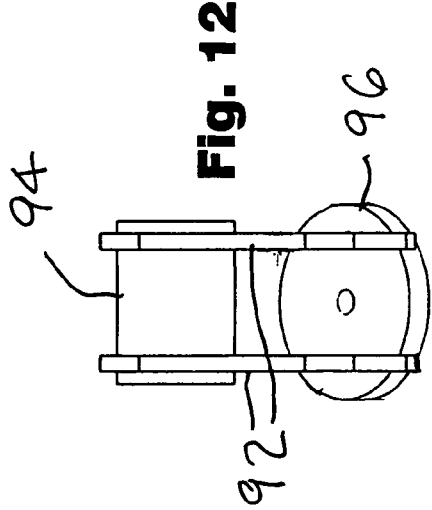
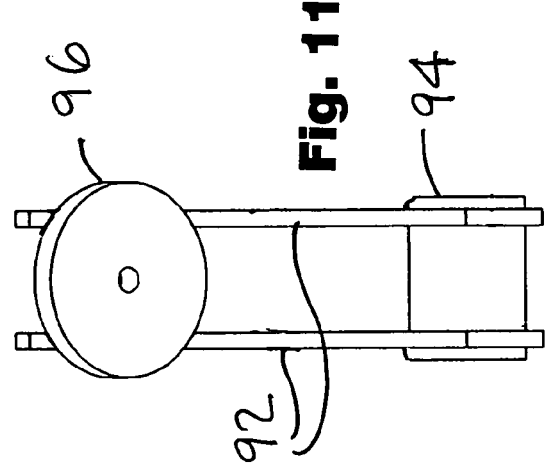

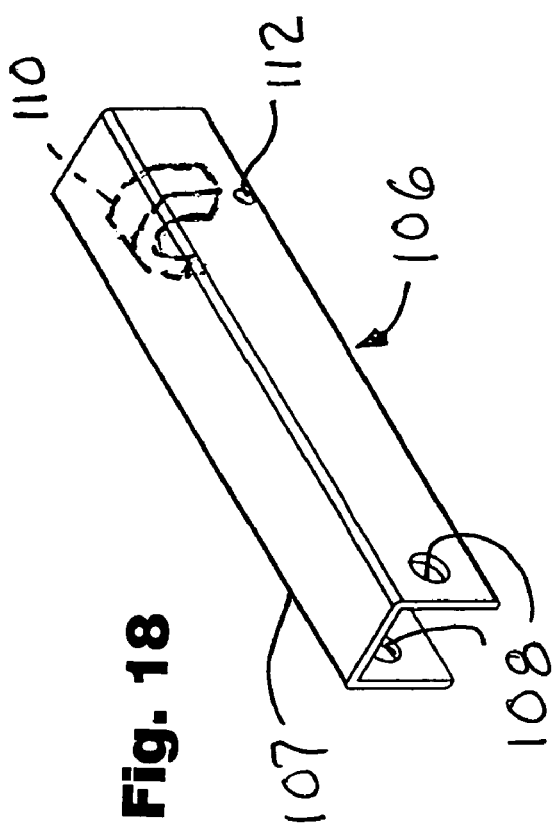
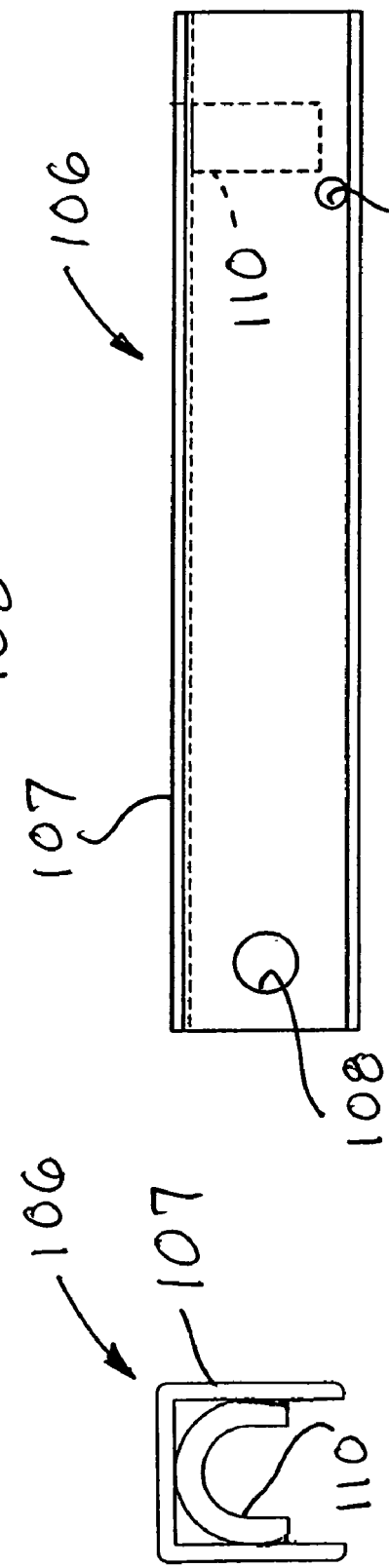
Fig. 18
Fig. 16
Fig. 17

RECREATIONAL AND UTILITY TRAILER

CROSS REFERENCE TO RELATED APPLICATION

This application claims the benefit of U.S. Provisional Application No. 60/526,730, filed Dec. 3, 2003, the entire contents of which are hereby incorporated by reference.

FIELD OF THE INVENTION

This invention relates to the field of land vehicle trailers and structures for outdoor sports and recreational activities.

BACKGROUND OF THE INVENTION

Ice fishing is a popular sport along with operation of ATV recreational vehicles and snowmobiles, hunting, camping, canoeing and the like. People are finding themselves doing more outdoor activities and many different types of activities throughout the year. Most of the different activities requiring a separate piece of equipment or trailer to transport the activity, especially because of the changing needs in different seasons.

Specialized trailers have been developed for individual activities such as snowmobile trailers, ATV trailers, personal watercraft trailers, and trailers for hauling canoes or small flat bottom boats used for hunting. In the past, portable ice fishing houses have been hauled in pickup trucks or on specially designed trailers that have been developed just for ice houses. Portable camping tents and trailers have been developed along with hunting blinds and finally, there are just plain utility trailers. As a consequence, there have been many different trailers developed for transporting equipment needed to perform these activities. It may also be noted that motorcycle riding has increased in popularity; however not all people desire to ride both directions (or even in one direction, for that matter) to a particular remote event. A trailer is thus needed to transport motorcycles in such a situation.

Space requirement for all of these trailers and equipment becomes a large burden and also cost. Especially space becomes a major factor in metropolitan areas.

A need existed for something to enable people to enjoy all these activities if they so desire without having to purchase or store all these different trailers. Heretofore nothing existed that could perform all these functions. Thus this invention allows people to enjoy more different types of activities without the expense or space needed to store all the different types of such trailers.

The present invention is a trailer that provides a portable structure useful for ice fishing, camping, and or hunting while at the same time providing for improved transportation of recreational vehicles and other equipment for such outdoor activities and the like.

A number of different types of activities can be performed with only one trailer which has options suitable for adapting the trailer to different outdoor activities. In addition the structure associated with the trailer is designed to collapse and store in a space provide in the trailer for storage.

SUMMARY OF THE INVENTION

The present invention includes the following: A recreational and utility trailer having a fluid operated suspension operable to raise a frame of the trailer to a first position suitable for transport and operable to lower the frame to a second position suitable for loading and unloading. The trailer may have a plurality of top deck which, in a closed position, form a top floor or working or load bearing surface above the frame. The top deck are each capable of being opened to a generally vertical position at which they form at least partial sides for the trailer. The invention may also include the following: A multi-functional recreational utility trailer having a dual floored trailer with the top floor being hinged and split enabling it to be folded up and a fixed subfloor attached to the trailer frame assembly providing a floor to the trailer when being used as a tent, hunting blind, ice fishing house, or other shelter. The fluid operated suspension may include hydraulically retractable wheels, which along with a hinged trailer tongue, enable the trailer to be lowered flat to the ground. Hinge type attachments may be mounted around some or all four sides of the trailer frame edge, to be used for option attachments enabling the trailer to be used for hauling various recreational vehicles or lawn and garden tractors, canoes or flat bottom boats or to support utility sides. A canvas enclosure may be attached to the main trailer between the subfloor and the split fold up top floor with snaps or hook and loop fastener strips or other detachable fasteners, enabling the canvas enclosure to be removed for storage and repair. A fold down frame assembly for the canvas enclosure is storable between the floors and enables the canvas enclosure to be raised and held upright in a box fashion.

Further features of the invention are: The multi-functional recreational utility trailer described above with a rigid framed trailer being made of a boxed frame with relatively tall and strong side and end members, and may have a center beam running lengthwise of trailer with several cross members across the width of trailer for support. The trailer may have a hinged trailer tongue for lowering the trailer flat to the ground. The hydraulic lines for the lift axles may be run through a square tube front frame assembly and a hydraulic pump may be mounted on a center or hitch beam. The cross member supports and center beam may be mounted below a top flush line of the boxed trailer frame to enable the subfloor to be mounted with enough clearance between subfloor and top deck to enable the collapsible canvas tent and framework to lie between top deck and subfloor. The top deck may have retractable arms that are recessed in the top deck fold down floor frame when the top deck is open, and that, when the top decks are closed or folded down, pivot out from the plane of the top deck fold down floor frame to allow the top deck of the trailer to rest on the center of the subfloor to support the center of the top deck. Around the top edge of the outside of the main trailer frame there may be mounting brackets that pins go through to hold trailer accessories in place. There may be two such mounting brackets equally spaced on each end of the trailer and three equally spaced on each side of the trailer frame opposite of each other, to receive pins therethrough to hold options in place such as tie downs to hold vehicles in place or side wagon racks. The trailer may have a jack mounted to the front tongue of the trailer. The tongue may be designed in such a way as to allow the mounting of a storage box.

Between the subfloor and top deck of the trailer described above is enough space to store the collapsible shelter framework and the canvas shelter. The canvas shelter may be designed with a zippered door on one or each end so when it is collapsed, the canvas or other fabric can be moved such that the retractable arms or spacers mentioned above that are attached to the top deck lids can rest directly on the subfloor and not on the canvas shelter. The canvas shelter may be square or rectangular in cross sectional shape so when raised looks like a box. The bottom edges of the shelter may be snapped to the mainframe between the subfloor and top deck lids, enabling the canvas to be removed for storage, repair or changing. The framework for shelter erection is comprised of two main end structures that are shaped like a box that have slide adjustments on each side so as to erect shelter until tight. There are two support bars of equal length that slide to adjust that fit between each end frame at the top corners to finish the shelter frame and keep end frame and shelter tight end to end. Also when end frames are raised they may be locked in an upright position by a small rod protruding down about ⅓ of the way up the end frame at an angle. The canvas shelter may have a window, and or a furnace exhaust ring; and, when used as a hunting blind, the shelter may have a quick drop side for shooting out of.

The hydraulic lift axles described above are designed in such a way as to allow the trailer to be lowered flat to the ground. The hydraulic lift suspension system may include a hydraulic pump and oil reservoir, which may be mounted on the center beam of the trailer tongue with hydraulic lines running back to each axle where a cylinder is mounted. One end of the cylinder is pivotably fixed to an intermediate location on a rocker arm. The rocker arm is pivoted at one end to the trailer frame and at the other end is supported by a compression device making up the suspension for the trailer. The other end of the cylinder is attached to a pivot arm assembly that also has an axle arm attached thereto to which the wheel axle is attached. The cylinder may be attached to approximately the center of the rocker arm. The opposite end of the cylinder may be attached to one end of the pivot arm which may be L shaped with the axle on the other end of the pivot arm, and with the pivot arm pivotably mounted to the trailer frame assembly intermediate the ends of the pivot arm. The compression device can be selected to have one of a number of different compression ratios and ranges of travel, enabling the trailer to have a desired spring rate and sufficient travel between the pivot arm and the trailer frame commensurate with a desired carrying capacity.

The optional mounts described above may be located around the top edge of the trailer frame and may be of cylinder type or box type. These mounts may make up half of what would be a hinge to allow for a pin to be passed through. Alternatively, the optional mounts may be threaded plates on the sides of the trailer frame suitable for receiving optional attachments. In either alternative, the mounts are situated as such to allow multiple options or attachments to be mounted.

BRIEF DESCRIPTION OF THE DRAWINGS

FIG. 5 is a top view of a pivot arm or movable wheel support useful in the practice of the present invention.

FIG. 6 is an end view of the support of FIG. 5.

FIG. 7 is a side view of the support of FIG. 5.

FIG. 8 is a perspective view of the support of FIG. 5.

FIG. 9 is a perspective view of a rocker arm for the suspension system of the present invention.

FIG. 10 is a side view of the rocker arm of FIG. 9.

FIG. 11 is an end view of the rocker arm of FIG. 9.

FIG. 12 is a top view of the rocker arm of FIG. 9.

FIG. 16 is a side view of a locking arm for the support of FIG. 5.

FIG. 17 is an end view of the locking arm of FIG. 16.

FIG. 18 is a perspective view of the locking arm of FIG. 16.

DETAILED DESCRIPTION

Figure 1:
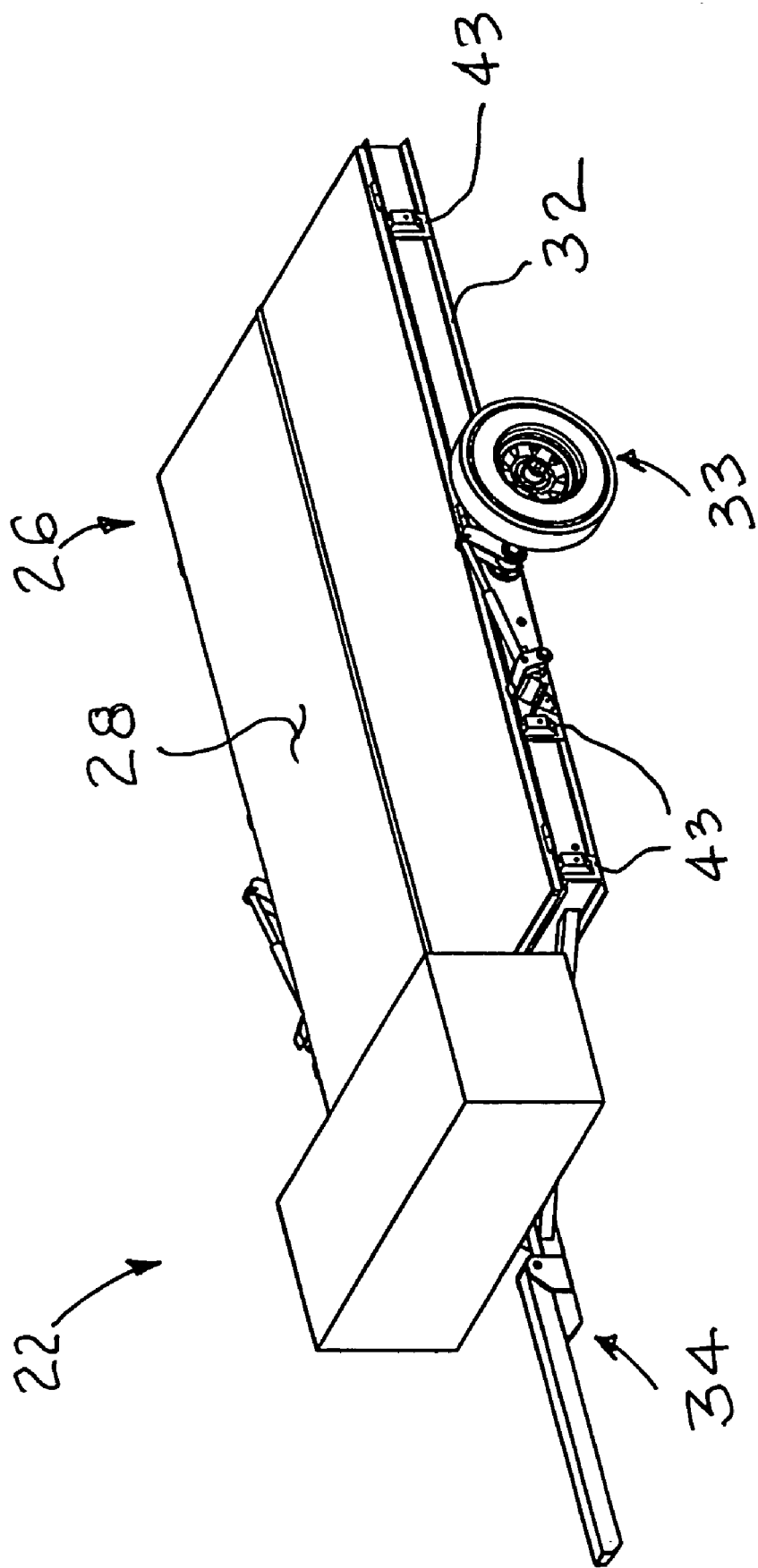
FIG. 1 is a perspective view of the trailer of the present invention in a first condition with a bed raised for transport.
Figure 2:
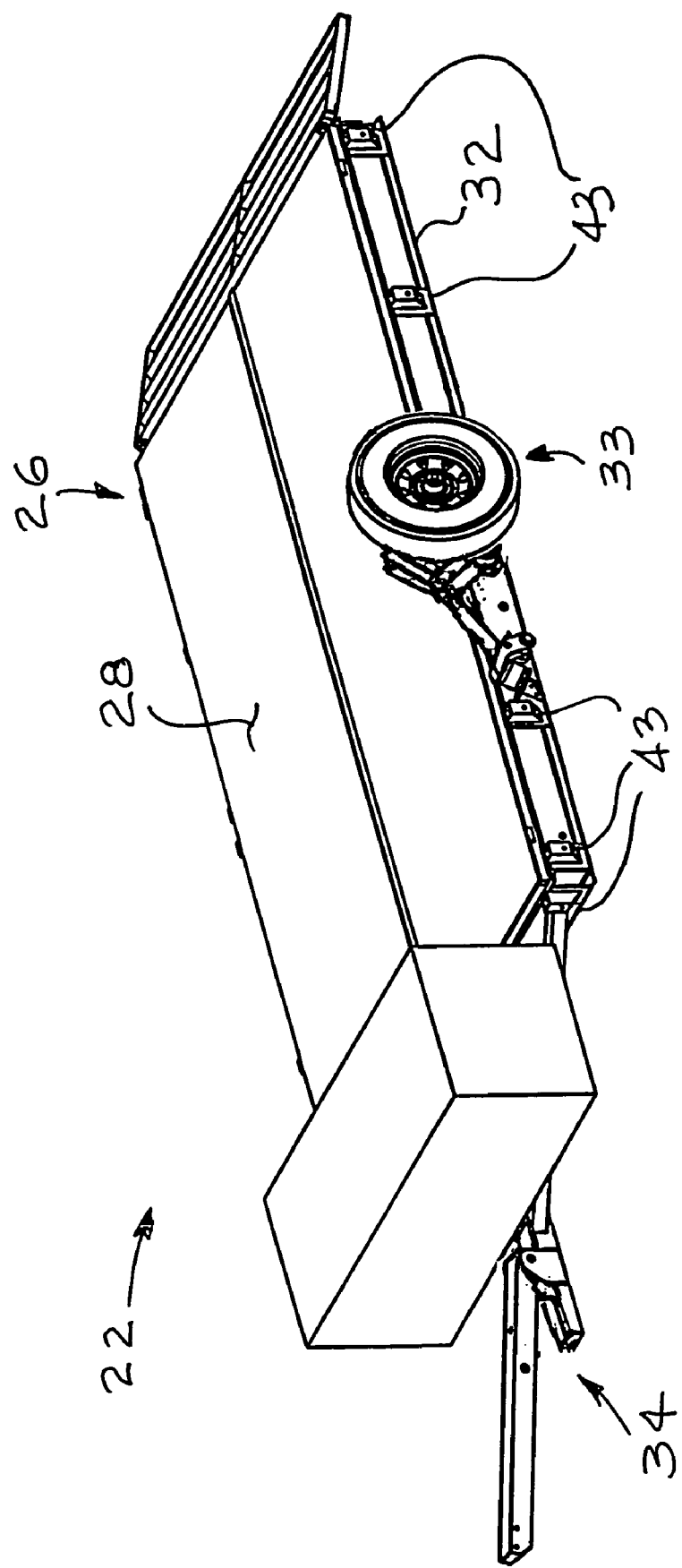
FIG. 2 is a perspective view similar to that of FIG. 1, except with the trailer in a second condition with the bed lowered for loading and unloading.
Figure 3:
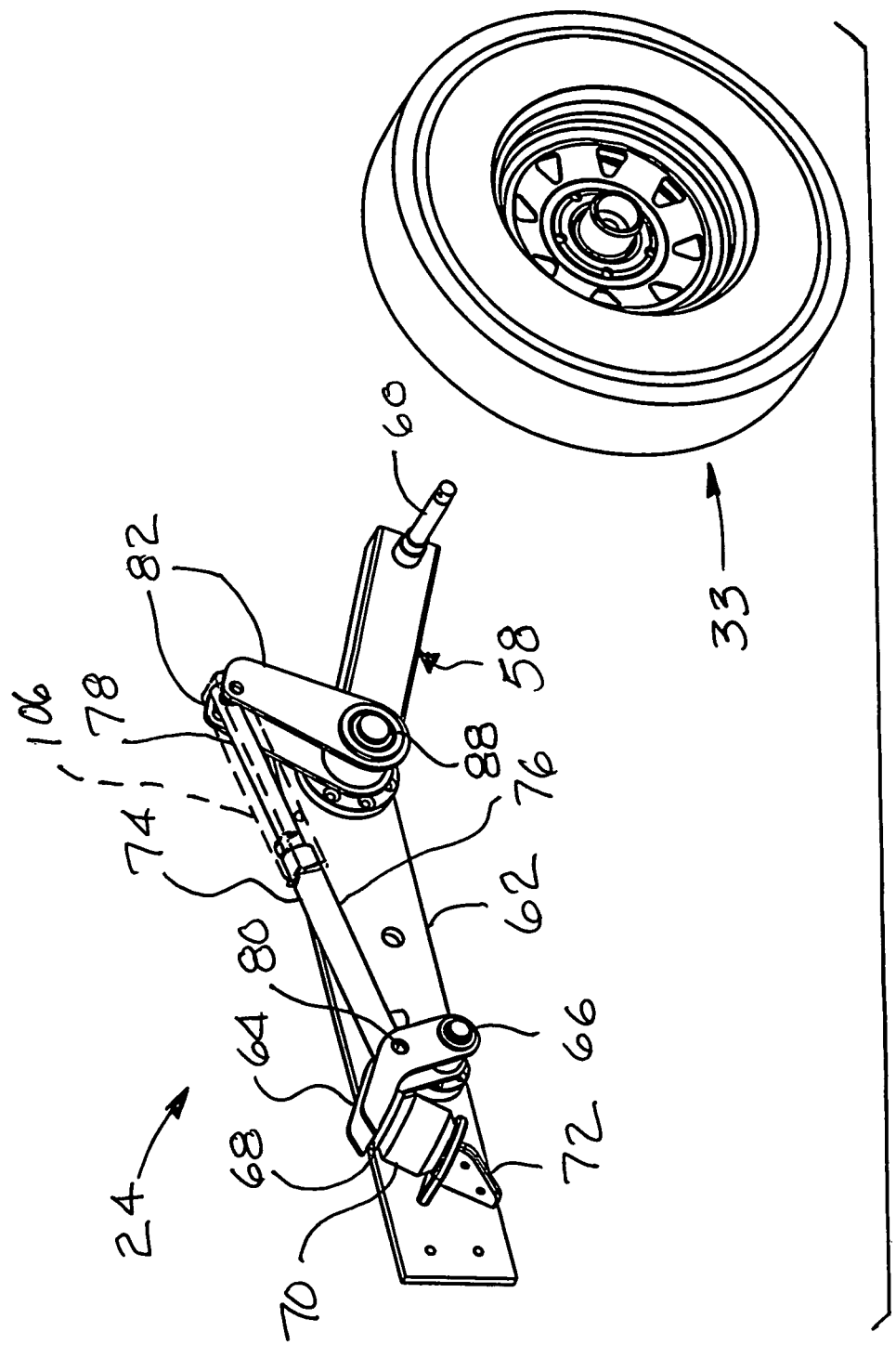
FIG. 3 is perspective, partially exploded view of a suspension system and wheel useful in the practice of the present invention corresponding to the condition shown in FIG. 1.
Figure 4:
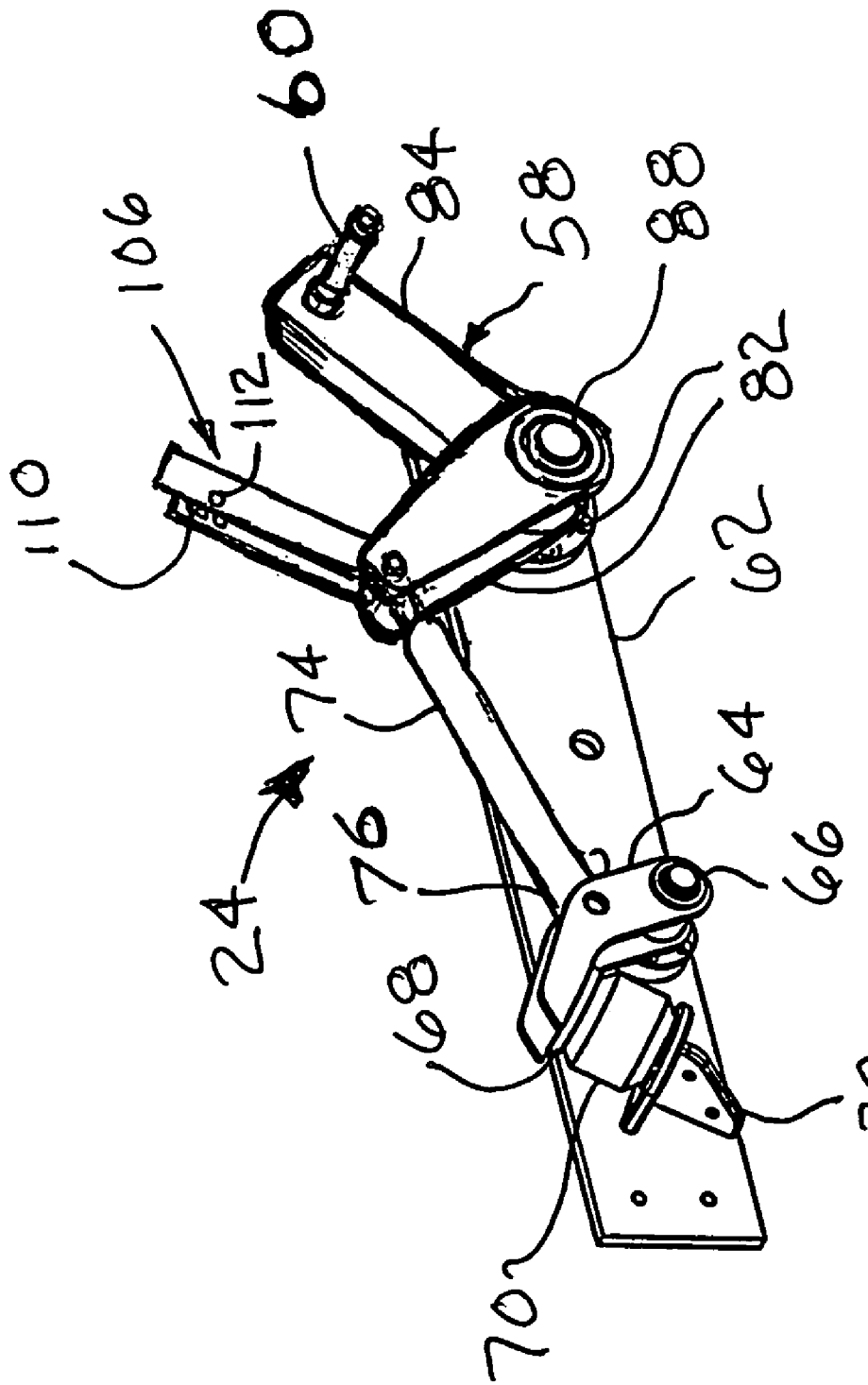
FIG. 4 is a view of the suspension system of FIG. 3, except with the suspension in the second condition, corresponding to that of FIG. 2.

Referring now to the Figures, and most particularly to FIGS. 1-3, a multi-functional recreational utility trailer 22 and suspension system 24 of the present invention may be seen. Referring now also to FIG. 21, the trailer 22 may include a dual floor 26, with a top deck 28 being hinged and split enabling it to be folded up and a subfloor 30 spaced below the top floor 28 and attached to a trailer frame assembly 32 (which may be seen in more detail in FIG. 20), the subfloor 30 providing a working or supporting surface when the trailer is being used as a tent or hunting blind or ice fishing house, or other similar shelter. The suspension system 24 may include a pair of wheels 33 which are selectively retractable using hydraulic power or the like. The suspension system 24, along with a hinged trailer tongue 34 enabling the main body of the trailer to be lowered completely flat and parallel to the ground. It is to be understood that FIG. 1 shows the trailer 22 in an elevated position or condition, ready for transport movement, and FIG. 2 shows the trailer 22 in a lowered position or condition, suitable for loading and unloading or stationary use as a shelter. Although not shown in FIGS. 1 and 2, the suspension system 24 may have conventional fenders 36 for the wheels 33, as shown in FIG. 21.

Figure 24:
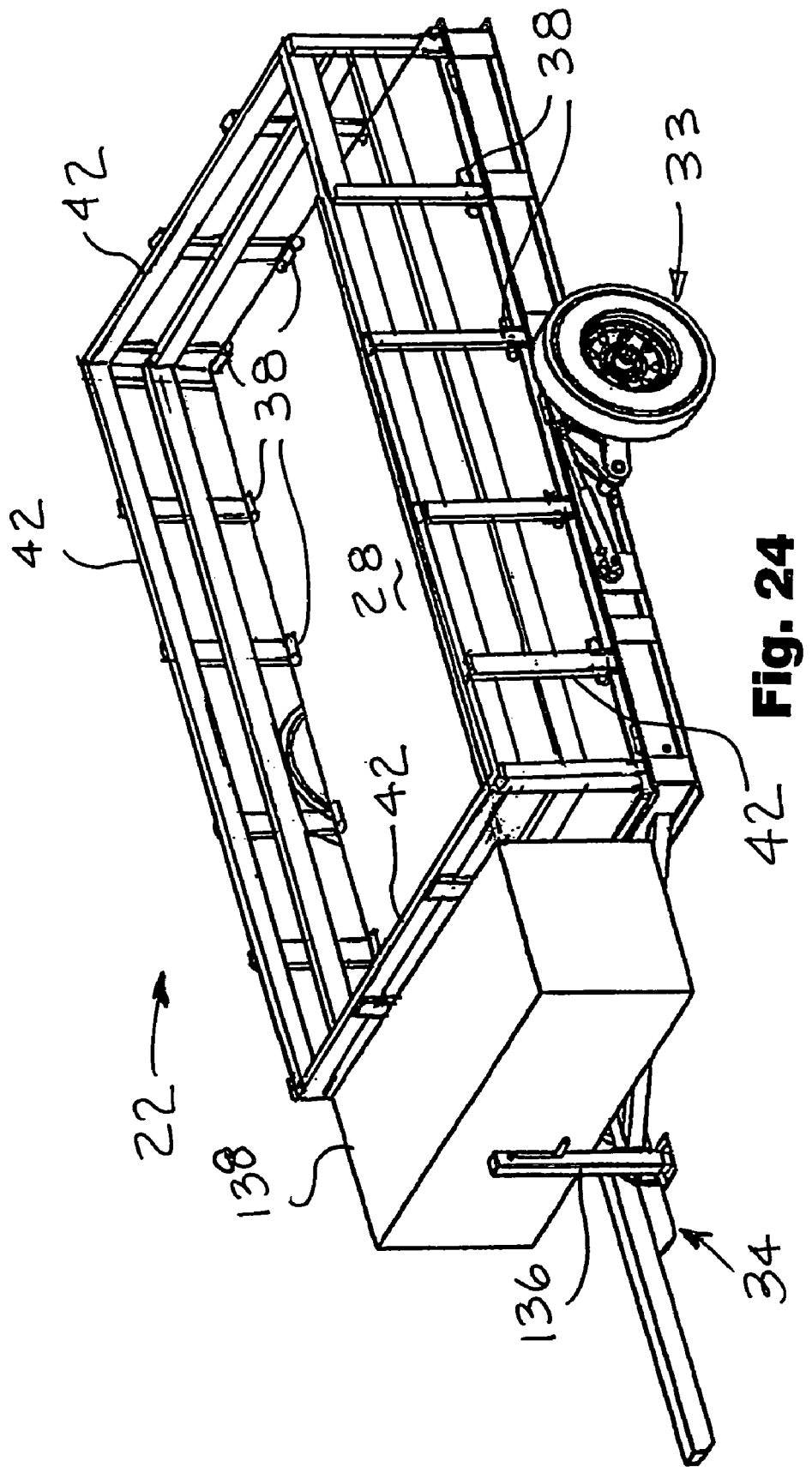
FIG. 24 is a perspective view similar to that of FIG. 1, except with upright, fence-like members added to the periphery of the bed of the trailer to transform the trailer into a utility trailer.

Attachment points 38 (see FIG. 21) may be mounted around all four sides of a top edge 40 of the trailer frame assembly 32 for attachment of options as desired, enabling the trailer 22 to be used for hauling various equipment including, but not limited to, recreational vehicles or lawn and garden tractors, canoes or flat bottom boats. The trailer is adapted to receive utility sides 42 as shown in FIG. 24. Alternatively (referring particularly to FIGS. 1, 2, and 20) the utility sides 42 may be received in supports 43 which are bolted to plates 39 using threaded holes 41.

Figure 25:
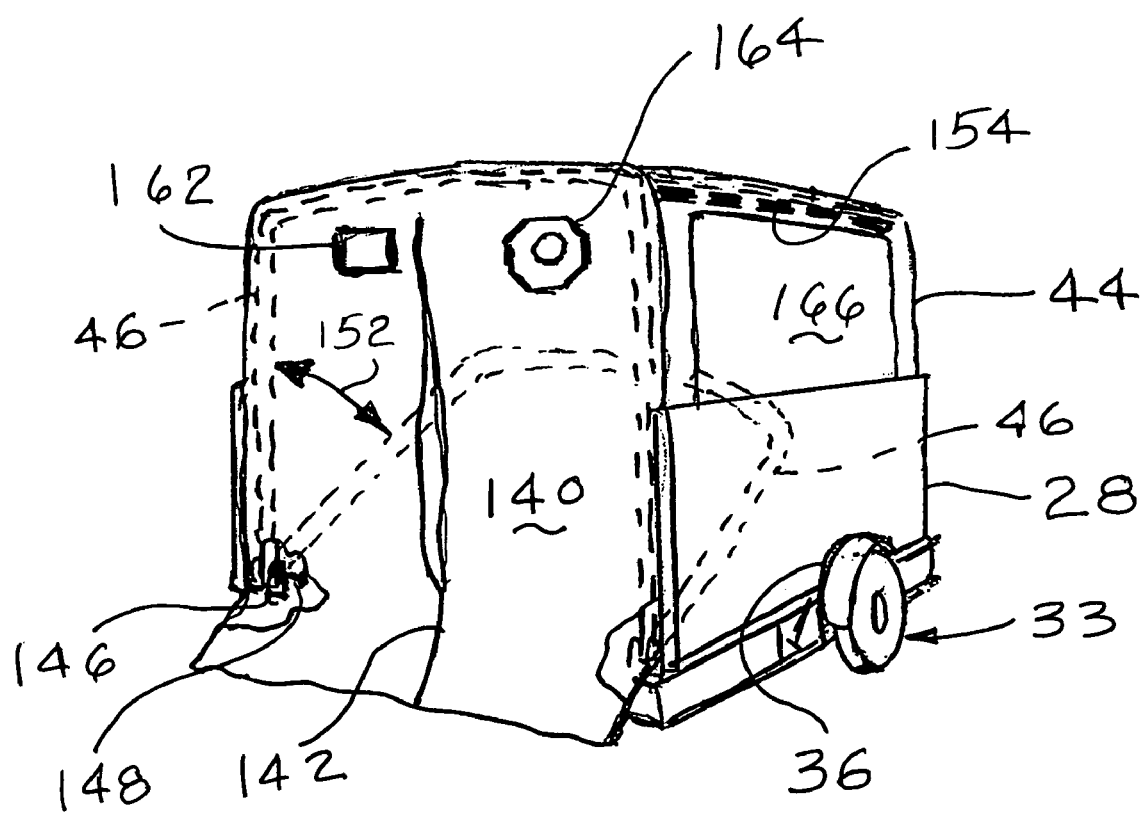
FIG. 25 is a perspective view similar to that of FIG. 21, with the panels in an upright position, and with a fabric tent-like cover erected over the frame of the trailer.

Referring now to FIG. 25, a fabric shelter or canvas enclosure 44 may be attached to the main trailer 22 between the subfloor 30 and top deck 28 with snaps and or hook and loop fastener strips (not shown) enabling removal for storage and repair. It is to be understood that as used herein, "canvas" refers to a woven or non woven fabric material suitable for an enclosure such as a tent.

Figure 26:
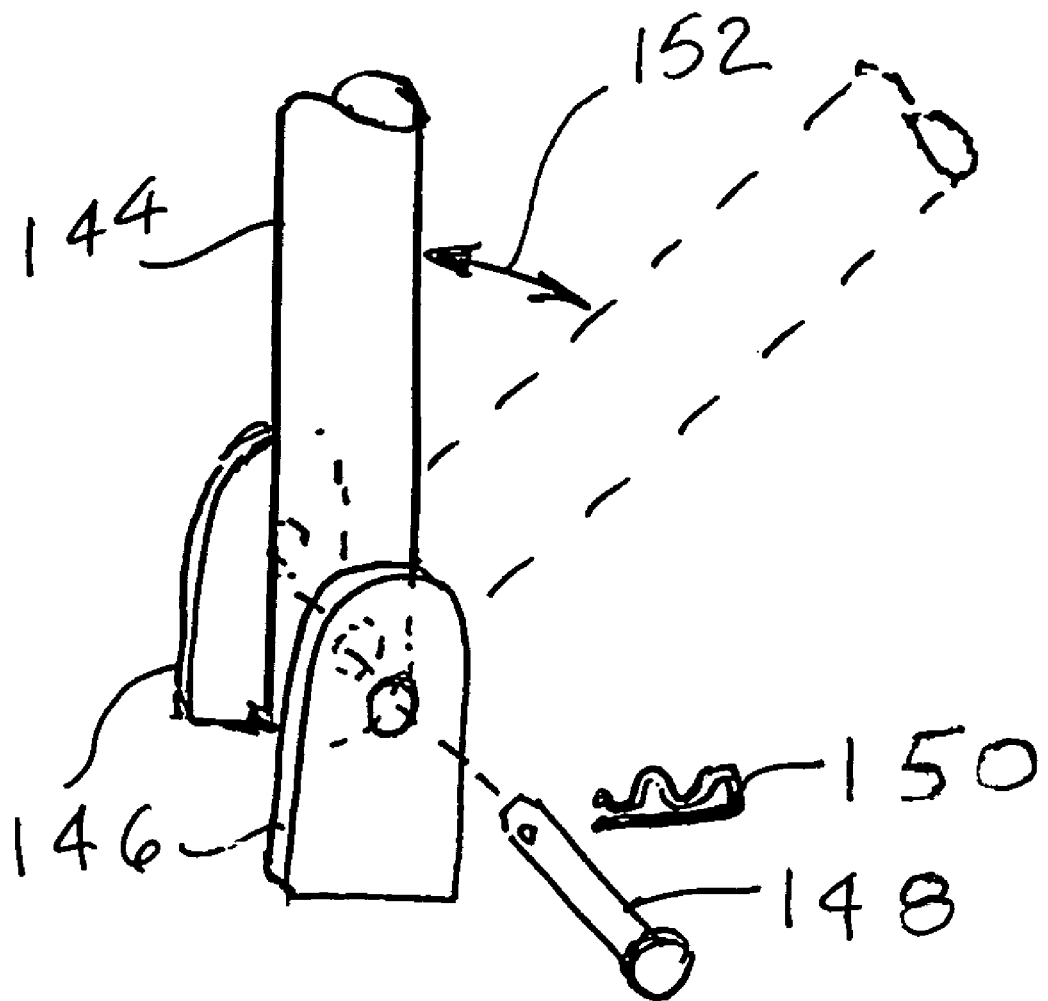
FIG. 26 is an enlarged detail view of a mounting arrangement for a tent support from FIG. 25.
Figure 27:
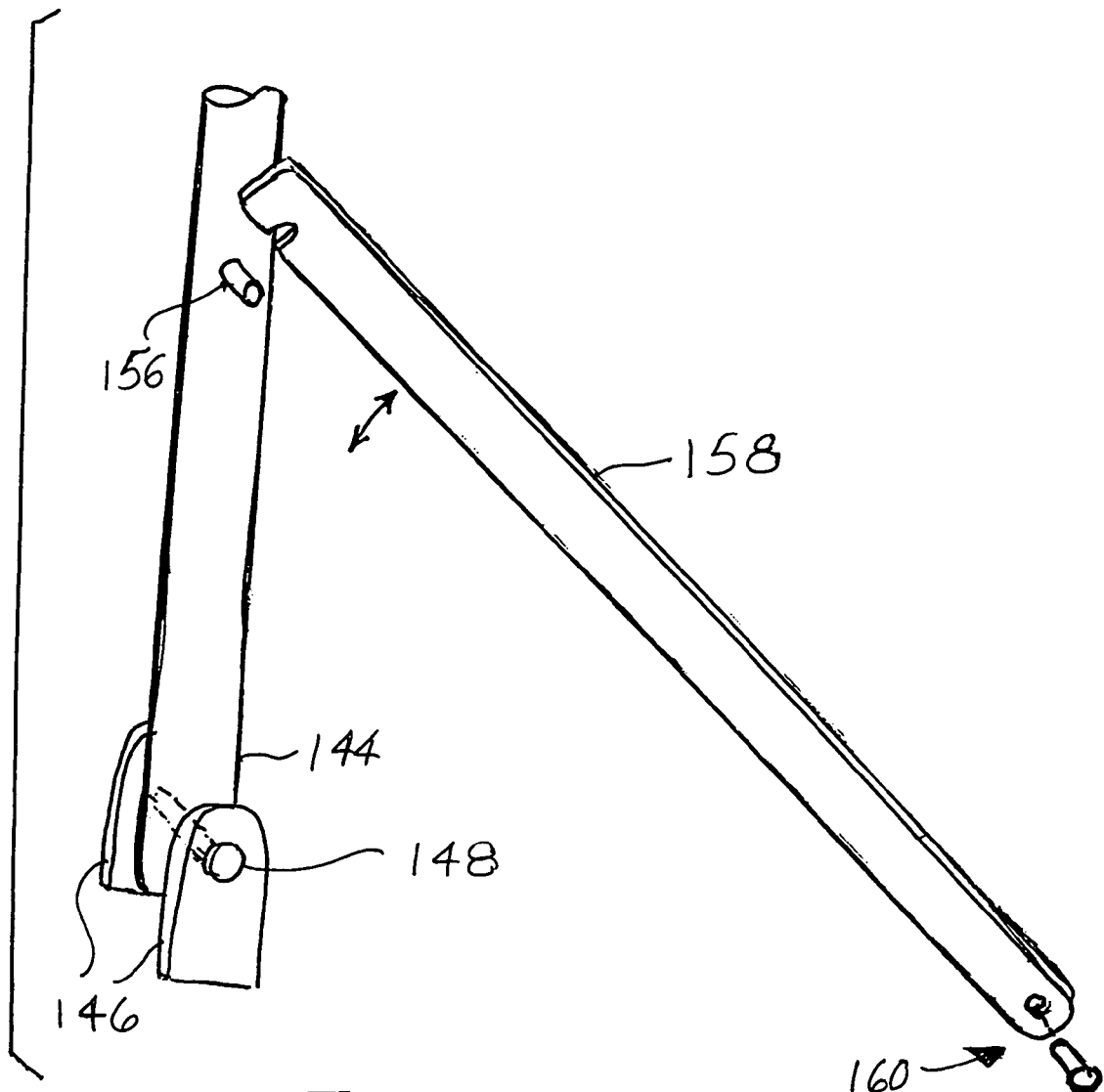
FIG. 27 is a detail view of a diagonal brace for the tent support from FIG. 25.

A shelter frame 46 for the canvas enclosure may be seen in phantom in FIG. 25, along with certain details thereof in FIGS. 26 and 27. The shelter frame 46, when erected, forms a generally box shaped structure, enabling the canvas enclosure to be raised and held upright in a tent or box like fashion. The shelter frame 46 may also be folded down and collapsed for storage and transport.

Figure 20:
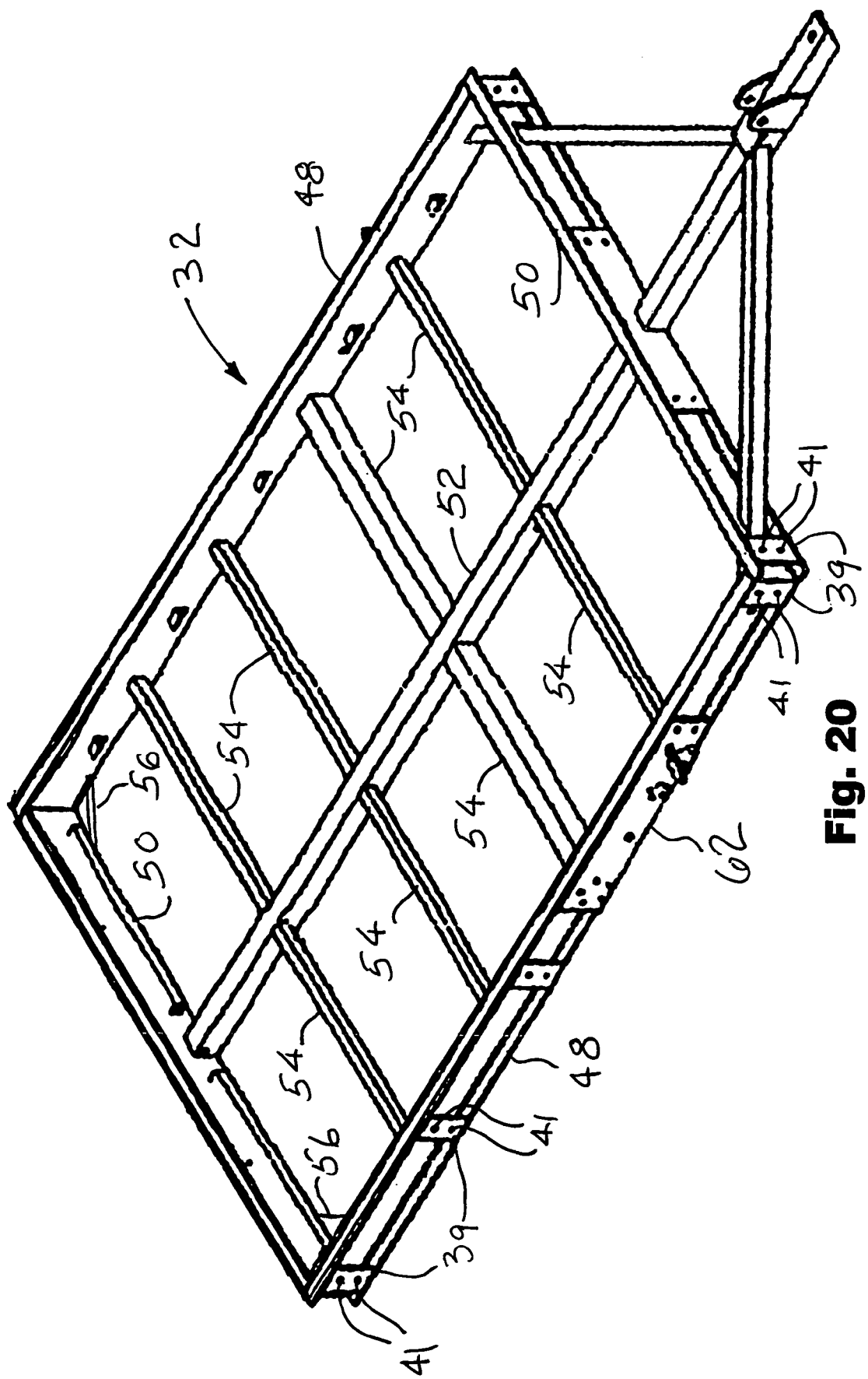
FIG. 20 is a perspective view of a frame for the trailer useful in the practice of the present invention.
Figure 21:
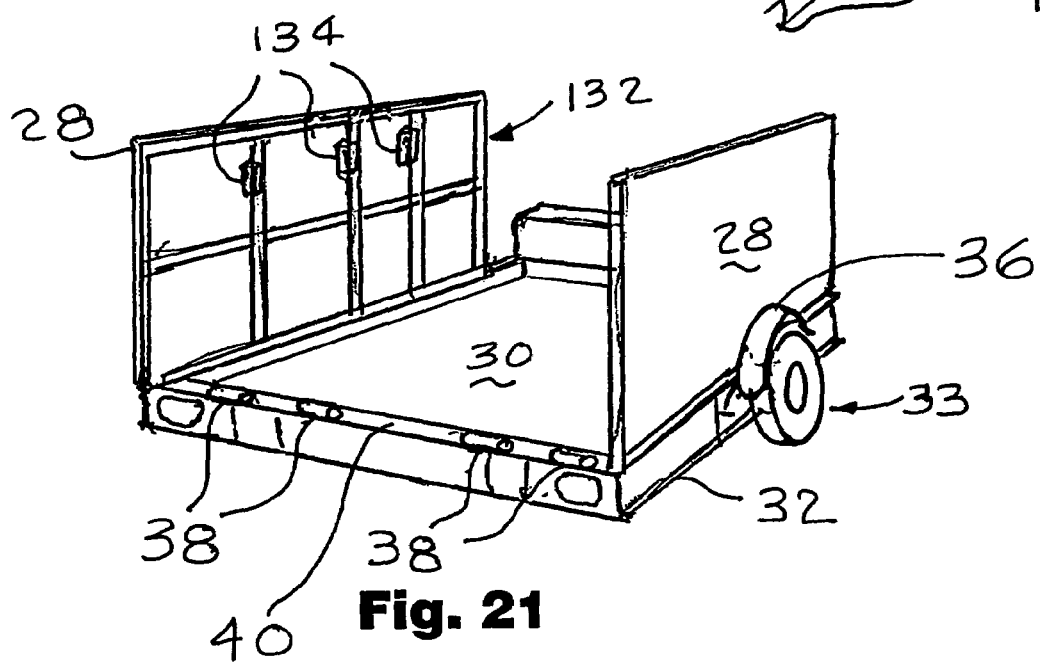
FIG. 21 is a perspective view of the trailer of the present invention, with a pair of panels raised to an upright position.

As may be seen most clearly in FIG. 20, the trailer 22 of the present invention preferably has frame 32 formed as a rigid box-like structure with rectangular steel member sides 48 and ends 50, with a center hitch beam 52 running lengthwise of the trailer 22, and with several cross member supports 54 extending across the width of trailer for support. The trailer frame may also include a flat gusset plate 56 on the bottom of some or each corner for stiffness and support.

Referring now to FIGS. 3-8, the suspension system 24 includes a pivot arm 58 having a lift axle 60. A support plate 62 has pivot arm 58 pivotably secured thereto, and plate 62 (as may be seen most clearly in FIG. 20 is attached to the trailer frame assembly 32. The suspension system 24 also includes a rocker arm 64 pivotably mounted to the plate 62 at one end 66 of the rocker arm 64. The other end 68 of the rocker arm 64 is engaged with a compression spring 70, which is mounted to plate 62 via an angle bracket 72. A fluid cylinder (preferably hydraulic) 74 has a cylinder end 76 pivotably secured to an intermediate location 80 on rocker arm 64. Cylinder 74 has a rod end 78 pivotably secured between a pair of fingers 82 extending from the pivot arm 58. Pivot arm 58 also has a generally rectangular tube 84 extending from a proximal end 86 at a main pivot 88 to a distal end 90 where the lift axle 60 is fastened to tube or arm 84.

Spring 70 is a compression device in the form of a hollow rubber spring, with different compression ratios available, making the device harder or easier to compress, thus enabling the trailer to have a different carrying capacity or a harder or softer ride, if desired. Compression spring 70 may be a purchased part, for example, Aeon type no. A180-65, available from Timbren Industries Inc., 381 Westrey Road South, Ajax, Ontario CANADA L156. The above noted spring has a 2000 pound nominal rated capacity, with a maximum deflection of 1⅞ inches, but other sizes or even types of springs may be used, as desired, while still remaining within the present invention. Both the type of spring and its rated load capacity may be selected based on the desired gross vehicle weight rating of the trailer and the stiffness desired in the suspension. The compression device 70 is preferably fastened to the bracket 72 and is located between bracket 72 and the rocker arm 64. It is to be understood that the rocker arm 64 and the pivot arm 58 are each free to rotate about their respective pivot mounts on the trailer frame.

Referring now also to FIGS. 9-12, various details of the rocker arm 64 may be seen. Rocker arm is preferably made up of a pair of side plates 92, a cylindrical bushing 94 and a disk-like pad 96, all of which may be welded together.

Figure 13:
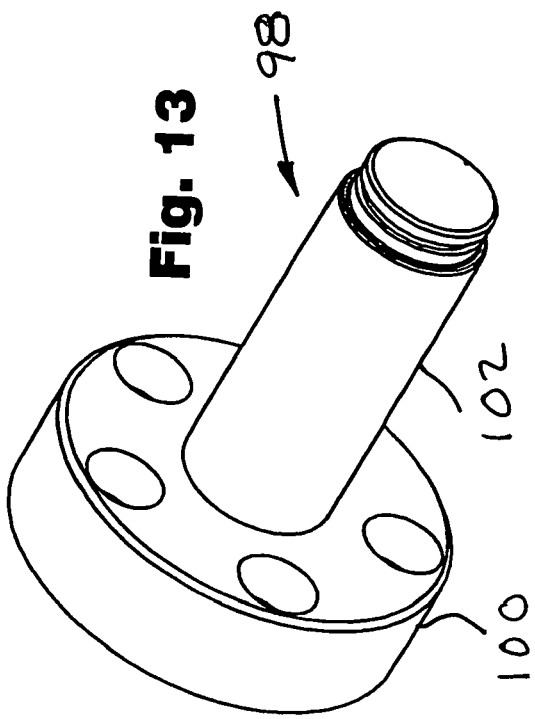
FIG. 13 is a perspective view of a pivot mount for the rocker arm of FIG. 9.
Figure 14:
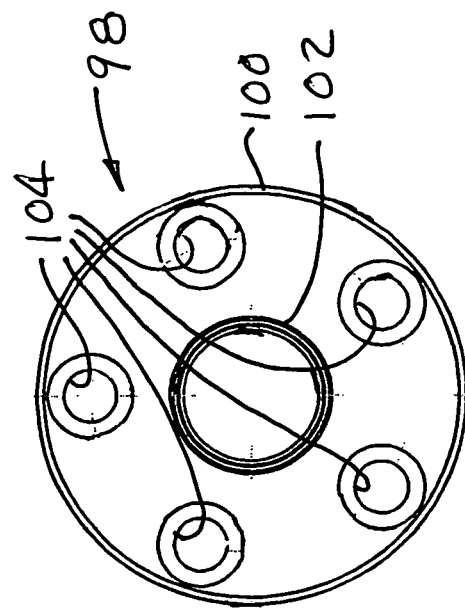
FIG. 14 is an end view of the pivot mount of FIG. 13.
Figure 15:
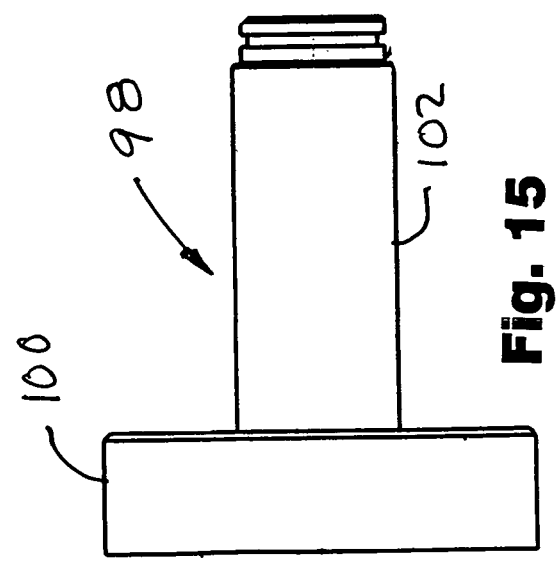
FIG. 15 is a side view of the pivot mount of FIG. 13.

Referring now also to FIGS. 13-15, a pivot mount 98 may be seen. It is to be understood that mount 98 is secured to plate 62 to pivotably support the rocker arm 64 via the cylindrical bushing 94. A similar mount is used to pivotably support the pivot arm 58 to plate 62. Mount 98 has a base plate 100 from which a pivot rod 102 extends. Plate 100 has a plurality of mounting holes 104 to receive conventional fasteners to secure the mount 98 to the plate 62.

Referring now to FIGS. 16-18, a locking arm 106 for the suspension system 24 may be seen. Locking arm 106 may be formed of a U-shaped channel 107, with a pair of pivot holes 108 in a proximal end and a generally semi-circular stop piece 110 welded inside the channel near a distal end, with a pair of locking pin holes 112 near the stop piece 110. It is to be understood that arm 106 is pivotably attached intermediate the rod end 78 and the fingers 82 of the pivot arm 58. When the suspension system 24 is in the first or raised position shown in FIGS. 1 and 3, the locking arm 106 may be positioned as shown in phantom in FIG. 3, and a locking clevis pin (not shown) may be inserted through locking pin holes 112 to secure the system from moving away from the first or raised position, because the stop piece will rest against an end of the cylinder 74 where the rod protrudes therefrom, preventing unintentional collapse of the rod 78 into the cylinder 76. When it is desired to lower the trailer, the locking clevis pin is removed from holes 112, and the arm 106 is moved to the position shown in FIG. 4, permitting the rod 78 to collapse into the cylinder 76, and allowing the pivot arm 58 to rotate about the main pivot 88, lowering the trailer to the ground or other surface beneath the wheels 33.

With the suspension system in the first or elevated position as shown in FIG. 1, static and dynamic vertical forces transmitted through wheel 33 will be communicated through pivot arm 58, locking arm 106, and cylinder 76 to rocker arm 64. Rocker arm 64 is supported by the rubber compression spring 70 which will act as both a spring and damper between arm 64 and the plate 61 attached to the trailer frame assembly 32. The suspension system will thus cushion the trailer 22 and damp vibrations due to road or ground irregularities encountered in transit with the trailer 22.

Figure 19:
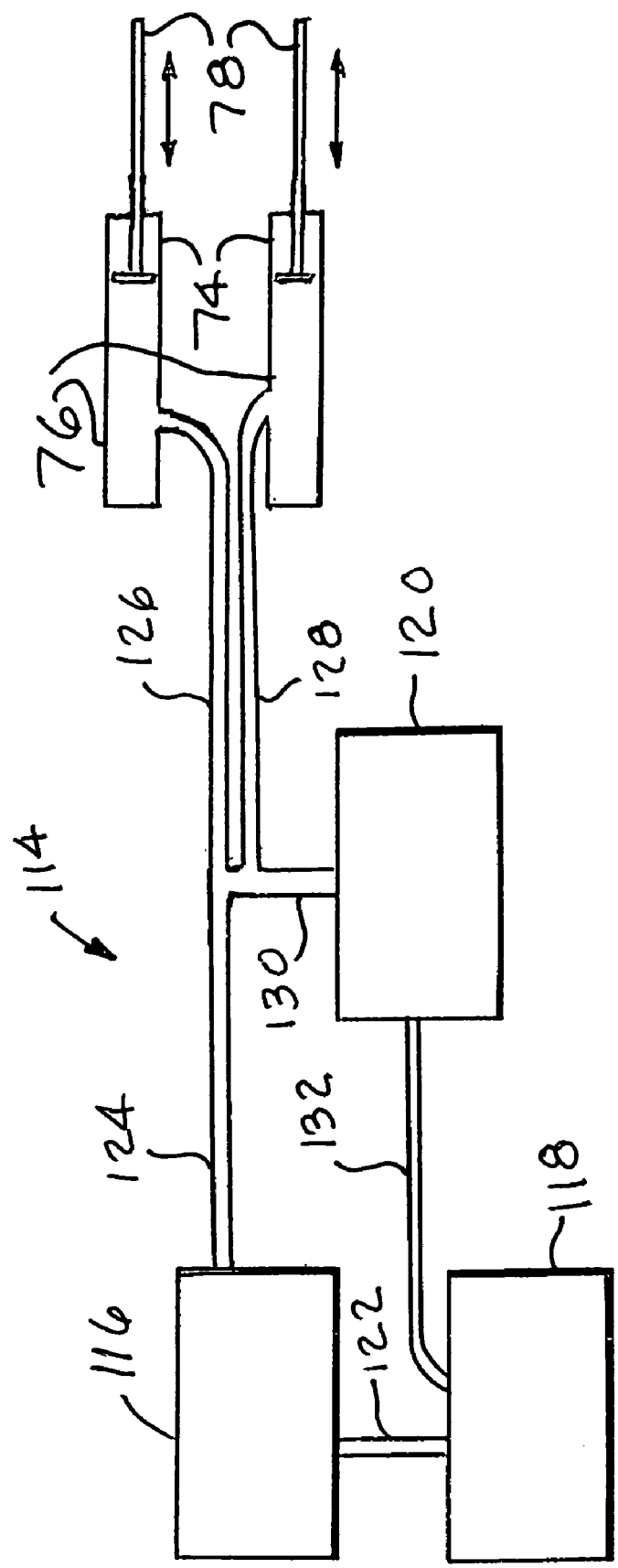
FIG. 19 is a simplified hydraulic circuit diagram for the trailer.

Referring now also to FIG. 19, a hydraulic circuit 114 for raising and lowering the trailer 22 may be seen. Circuit 114 includes hydraulic cylinders 74 and a pump 116, a reservoir 118, and a valve 120. Pump 116, which may be a manual or powered pump, may be selectively placed in an ON condition at which time it will draw hydraulic fluid from reservoir 118 via a suction line 122 and deliver the fluid via supply lines 124, 126 and 128 to the cylinders 74 while pump 116 is operated, to drive rods 78 out of the cylinders 74, raising the trailer 22 to the first or elevated position. Once the rods 74 are fully extended, pump 116 is turned OFF. Raising the trailer occurs with valve 120 in a CLOSED condition, blocking flow from a tap 130 to a return line 132. When it is desired to lower the trailer, valve 120 is placed in an OPEN condition (it being understood that the pump 116 will remain OFF at this time) and fluid will be allowed to flow from the cylinders through lines 126 and 128, through tap 130, valve 120 and return line 132 to reservoir 118.

The hydraulic supply lines 124, 126 and 128 for the lift axles may be run through a portion of a square tube used for a front portion of the trailer frame assembly 32, and the hydraulic pump 116 may be mounted on the center hitch beam 52.

Referring now again to FIG. 20, the cross member supports 54 and center hitch beam 52 are preferably mounted below a plane containing a top flush line of the box-like trailer frame (made up of sides 48 and ends 50) to provide sufficient clearance in the form of a storage compartment between the subfloor 30 and top deck or floor 28 to enable the canvas enclosure or fabric shelter 44 and the shelter frame 46 to lay between top deck 28 and subfloor 30.

Figure 23:
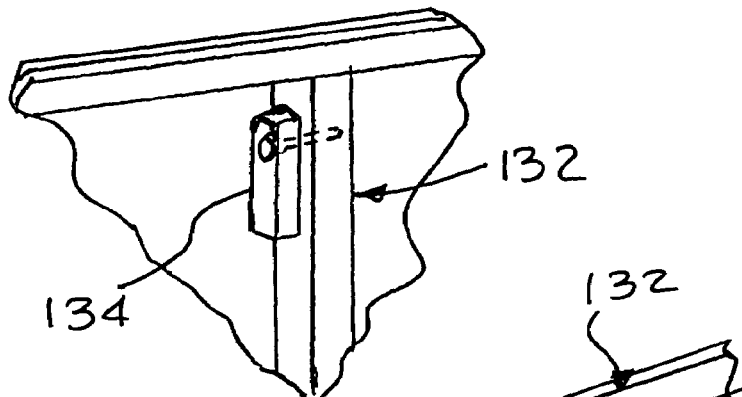
FIG. 23 is a detail view similar to that of FIG. 22, except with the panel in the upright position.
Figure 22:
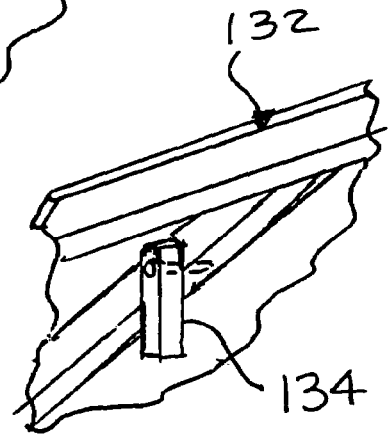
FIG. 22 is a first detail view showing a portion of one of the panels of FIG. 21 in a partially raised position.

Referring now to FIGS. 21-23, the top deck 28 has a supporting frame 132 and preferably has retractable support arms 134 that extend into the storage compartment between the top deck and subfloor when the top deck is folded down, and retract out of the way when the top deck is vertical (as shown in FIG. 23). Arms 134 are shown partly extended in FIG. 22, it being understood that gravity will open and extend the arms 134 from frame 132 as the frame 132 and top deck 28 is moved to a closed, generally horizontal position. Similarly, arms 134 will retract and recess into frame 132 as the top deck is moved to an open, generally vertical position, as shown in FIGS. 21 and 23.

Around the top edge of the outside of the main trailer frame there are mounting brackets 38 (see FIG. 21) that pins (not shown) go through to hold trailer accessories in place. Preferably there may be two or more pair equally spaced on each end of the trailer frame and three or more equally spaced on each side of the trailer frame opposite of each other. Each mounting bracket may be in the form of a hinge half, adapted to receive a pin to hold an option in place such as a tie down bracket to hold a vehicle in place on the top deck of the trailer. As mentioned above, the accessory mounts may be formed as plates 39 attached (for example by welding) to the sides of the trailer frame as shown in FIG. 20, with threaded holes 41 in the plates 39 adapted to receive optional attachments, for example the wagon rack supports 43.

Referring now also to FIG. 24, the trailer 22 may have a jack 136 mounted to a fixed portion of the front tongue of the trailer. The fixed portion of the tongue is designed in such a way as to allow the mounting of a storage box 138. The trailer may also have submersible turn, brake and signal lights may also have clearance lights on the front of each side and the back of each side. It is to be understood that the hinge pin version of the mounts for the side wagon rack assemblies is shown in FIG. 24, but the supports 43 may be used in place of the hinge pin type attachment points 38 shown in FIG. 24.

Referring now to FIGS. 21 and 25, Between the subfloor 30 and top deck 28 of the trailer 22 is enough space to store the collapsible framework or frame assembly 46 and the canvas enclosure or shelter 44. The canvas shelter 44 may include a door 140 on one or both ends, with one or both doors having a zipper 142 so when the shelter 44 is collapsed, the retractable spacers or arms 134 (as shown in FIGS. 21-23) will rest on the subfloor and not on the canvas shelter 44, it being understood that the fabric of the shelter 44 is free to be moved out from under the arms 134 because of the zippers 142. With the fabric moved out of the way in the storage compartment, the center top deck frame supports 134 rest on the subfloor 30 and not on the canvas, to prevent chafe from wearing a hole in the canvas. The top floor center frame supports 134 may each be formed of a solid piece of material (such as aluminum) that is pivotably mounted to the frame members on the underside of the top floor 28 near the centerline of the trailer 22. Although shown attached to the left side top floor portion in FIG. 21, it is to be understood that the center frame supports may be attached to the right side top floor portion, or to both portions, as desired. Preferably, if a lip along the centerline of the trailer supports one of the top floor portions on the other top floor portion, the center frame supports will at least be attached to the top floor portion that supports the other top floor portion, to provide the best structural support for a load resting on the top floor of the trailer.

The canvas shelter 44 is preferably rectangular in plan, and may have a flat, pitched or peaked roof line, with a generally rectangular shape below the roof line when raised. The bottom edges of the shelter may be removably secured to the trailer with snaps or other conventional fasteners to the mainframe between the subfloor and top deck lids. This enables the canvas to be removed for storage, repair or changing. The entire shelter (canvas and supporting frame) is a complete and separate structure which may be removed from the trailer, if desired, for repair or storage.

Referring now to FIGS. 25-27, the bottom of a member 144 of shelter frame 46 is pivotably mounted to the trailer 22 at canvas shelter supports 146 as shown in FIG. 26 with a removable pivot pin 148 which may be retained with a cotter pin 150 or other conventional means. The framework for shelter erection has two main end structures, one at each end of the trailer, that are connected to be shaped like a box when assembled. For storage each main end structure may be pivoted down along the longitudinal axis as indicated by arrow 152 and toward the center of the trailer as indicated by the dashed line image of the rear end structure of the frame 46 in FIG. 25. The frame assembly may have slide adjustments on each side to permit adjustment of the frame assembly until the canvas enclosure is tight to the frame assembly.

There are two support bars 154 of equal length that slide to adjust that fit between each end frame at the top corners to finish the shelter frame and keep end frame and shelter tight end to end. Also when end frames are raised they may be locked in place upright by a small rod protruding down about ⅓ of the way up the end structure frame at an angle. A swinging locking arm 158 is raised from a pivoting attachment 160 to the trailer frame and engaged with the small protruding rod 156 on the end structure frame FIG. 27 shows the detail of the locking arm 158 and rod 156.

Returning to FIG. 25, some options on the shelter include one or more windows 162 of a clear polymer material that can be exchanged for screening material for summer use, and a furnace exhaust ring 164 for winter use. When used as a hunting blind, the shelter may have a quick drop side 166 for shooting out of, and a camping accessory for tenting is an awning (not shown) that may be fastened to the back end of the canvas shelter above door 140.

The optional accessory or load attachment points 38 referred to above may be of a cylinder type or box type. These attachment points or mounts make up half of what would be a hinge to allow for a pin to be passed through. These mounts may be situated as desired to allow multiple options or attachments to be mounted or to secure a load on the trailer 22. One option is to have a plurality of mounts on the back edge of the trailer (as shown in FIG. 21) for attaching (for example) a pair of ramps to the trailer with various ramp-to-ramp spacing. Again as mentioned above, the plates 39 with threaded holes 41 may be used as accessory mounts.

In the practice of the present invention it is to be understood that pneumatic cylinders may be used in place of the hydraulic cylinders 74, with a pneumatic pump and valve in a pneumatic circuit similar to that shown in FIG. 20, if desired. Furthermore, it is to be understood that the alternatives of a manually operated or powered pneumatic pump may be used to raise the trailer, if desired. Such a powered pump, (whether hydraulic or pneumatic) may be driven from an electric motor, for example, with a suitable electric circuit to control the motor and pump. As a still further alternative, an all electric system may replace the circuit of FIG. 20, with for example, electric motors driving a rack or worm gear which replaces each of the hydraulic cylinders to move the pivot arms to raise and lower the trailer. In this alternative, the electric motor must be bidirectional, with an appropriate control circuit, to move the cylinder arms in both the raising and the lowering directions. Suitable limit switches may be included, if desired, to prevent overloading the motors at end-of-travel conditions for the rack or worm gear.

It may thus be seen that the present invention is directed to a multi-functional recreational utility trailer designed with a subfloor and a fold-up top floor which enables a canvas tent to be deployed and which is attached to the sub-floor by means of snaps or hook and loop fasteners or both. The trailer also has hydraulically retractable wheels and a hinged trailer tongue which enables the trailer to be lowered flat to the ground while still hitched for easy loading and unloading of recreational vehicles or other things. The trailer can become a portable ice fishing house with the combination of pop-up canvas and retractable wheels. The trailer also functions as a camping tent or structure which can be lowered to the ground or kept elevated off the ground. With different color canvases it can also or alternatively be used for a hunting blind. With non-slip water resistant subfloor and personal water craft attachment points or devices, it can also or alternatively be used for transporting and launching of personal watercraft. With all attachments, the trailer can be used for the transportation of almost any kind of recreational vehicle or implement: snowmobiles, ATV's, motorcycles, bicycles, personal water craft, jet bikes, jet skis, canoes, small tractors, flat bottom duck boats, lawn mowers, all with only one trailer.

This invention is not to be taken as limited to all of the details thereof as modifications and variations thereof may be made without departing from the spirit or scope of the invention.

What is claimed is:

1. A recreational and utility trailer assembly comprising:
   a. a generally horizontal trailer frame;
   b. a pair of suspension assemblies each connected between the trailer frame and a wheel supporting the trailer for towed transport of the trailer, wherein each suspension assembly includes a fluid cylinder having an extendable rod and the suspension assembly is movable to a first position by extending the rod from the fluid cylinder wherein the trailer frame is supported in a relative elevated position above the surface below the wheels, and is selectively movable to a second position by retracting the rod into the fluid cylinder wherein the trailer frame is lowered to a level below that of the first position for ease of loading and wherein the fluid cylinder in each suspension assembly is connected between the suspension assembly and the trailer frame and further wherein each suspension assembly includes a locking arm selectively connectable across the rod of the fluid cylinder to hold the suspension assembly in the first position.

2. The assembly of claim 1 wherein the locking arm is movable to an unlocked position wherein the suspension assembly may be moved between the first and second positions.

3. The assembly of claim 1 wherein the fluid cylinder is hydraulic.

4. The assembly of claim 1 wherein the fluid cylinder is pneumatic.

5. The assembly of claim 1 wherein the locking arm is movable away from the rod of the fluid cylinder to allow the suspension assembly to move to the second position.

6. The assembly of claim 1 wherein the suspension further comprises a compression device connected between the suspension assembly and the trailer to act as a spring.

7. The assembly of claim 6 wherein the compression device is a rubber spring.

8. A recreational and utility trailer assembly comprising:
   a. a generally horizontal trailer frame supported on at least two wheels for transport;
   b. at least one top deck located on an upper surface of the trailer frame and positionable to:
      i. a first position wherein the top deck is generally horizontal and located suprajacent the trailer frame and capable of supporting a load on the trailer, and
      ii. a second position wherein the top deck is generally vertical and provides access to a storage region in the trailer; and
   c. a fabric shelter selectively positionable to an erected condition and a collapsed condition.

9. The assembly of claim 8 wherein the at least one top deck comprises a pair of deck doors.

10. The assembly of claim 8 wherein the trailer assembly further comprises a subfloor spaced below and apart from the at least one top deck.

11. The assembly of claim 10 wherein the storage region is located between the top deck and the subfloor.

12. The assembly of claim 11 wherein the at least one top deck has a supporting frame and at least one support arm pivotably connected to the supporting frame such that the support arm supports the at least one top deck when the top deck is in the first position.

13. The assembly of claim 12 wherein the at least one support arm retracts towards the supporting frame when the at least one top deck is in the second position.

14. The assembly of claim 8 further comprising a shelter frame for supporting the fabric shelter on the trailer in the erected condition when the at least one top deck is in the second position.

15. The assembly of claim 14 wherein the shelter frame and fabric shelter are received in between the at least one top deck and a subfloor when the frame and fabric shelter are in the collapsed condition and the at least one top deck is in the first position.

16. The assembly of claim 8 wherein the fabric shelter includes fasteners detachably securing the fabric shelter to the trailer.

17. The assembly of claim 14 wherein the shelter frame has a pair of main end structures connectable to form a generally box shaped frame for the fabric shelter in the erected condition.

18. The assembly of claim 8 wherein the fabric shelter includes a closable door at least one end thereof.

19. The assembly of claim 18 wherein the at least one top deck has a supporting frame and at least one support arm connected to the supporting frame and supporting the at least one top deck when the top deck is in the first position and the fabric shelter is movable to a position not directly under the at least one support arm when the shelter is stored beneath the at least one top deck.

20. The assembly of claim 8 further comprising a plurality of attachment points located along at least a portion of a periphery of the trailer.

* * * * *